United States Patent [19]

Takacs et al.

[11] 4,137,000
[45] Jan. 30, 1979

[54] CUTTING TOOL

[75] Inventors: Victor C. Takacs; Joseph E. Takacs, both of Houston, Tex.

[73] Assignee: Triangle Grinding, Inc., Houston, Tex.

[21] Appl. No.: 833,084

[22] Filed: Sep. 14, 1977

[51] Int. Cl.² .............................................. B26D 1/12
[52] U.S. Cl. .................................. 407/101; 10/101 R; 407/107; 407/117
[58] Field of Search ............... 407/101, 102, 107, 111, 407/112, 117; 10/101 R

[56] References Cited

U.S. PATENT DOCUMENTS

| 976,755 | 11/1910 | St. John | 407/107 |
|---|---|---|---|
| 2,846,756 | 8/1958 | Novkov | 407/101 |
| 3,028,657 | 4/1962 | Almen | 407/101 |
| 3,205,557 | 9/1965 | Frommelt et al. | 407/117 |
| 3,534,457 | 10/1970 | Mueller | 407/117 |
| 3,551,977 | 1/1971 | Novkov | 407/117 |
| 3,686,729 | 8/1972 | Cochran | 407/101 |
| 3,775,817 | 12/1973 | Hertel | 407/101 |
| 3,852,859 | 12/1974 | Carpenter | 407/101 |
| 3,864,799 | 2/1975 | McCreery et al. | 407/101 |

Primary Examiner—Harrison L. Hinson
Attorney, Agent, or Firm—Bill B. Berryhill

[57] ABSTRACT

A cutting tool which may comprise: an elongated bar member having a wedge-shaped recess at one end thereof; a wedge-shaped anvil member rigidly and removably fastened in the wedge-shaped recess of said bar member, having an elongated recess in which a cutting insert may be received; and a clamp member removably fastened to the bar member for rigidly clamping the cutting insert in the elongated recess.

6 Claims, 5 Drawing Figures

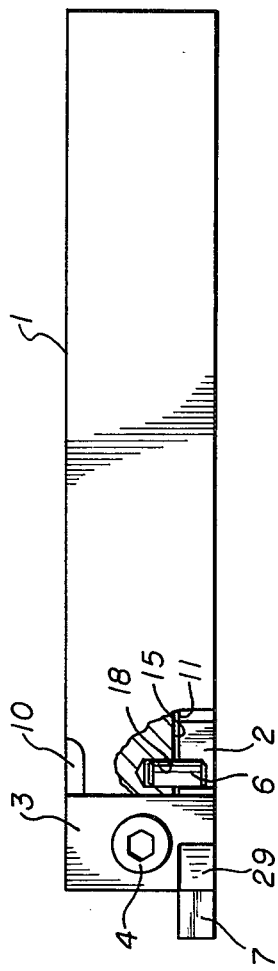
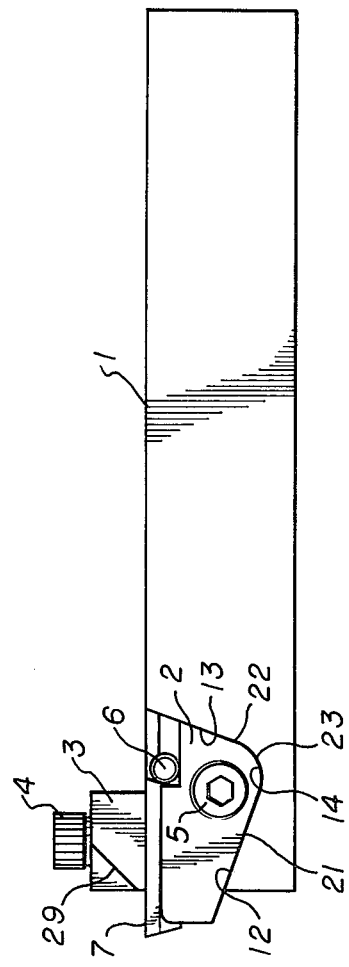
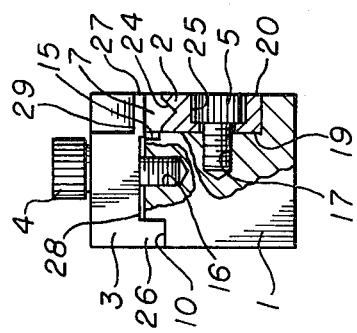

CUTTING TOOL

BACKGROUND OF THE INVENTION

1. Field of the Invention

The present invention pertains to cutting tools for machining and finishing metal. Specifically, it pertains to cutting tools especially adapted for external or internal threading and shallow grooving of metal.

2. Brief Description of the Prior Art

In conventional machining of metal, the metal part to be machined is commonly fastened in a chuck or vise and a cutting tool fastened to a stationary tool post of the machine. The machine then rotates the part relative to the tool as the tool is fed into the part. In such machining, the tool may include an elongated bar at the end of which is attached a replaceable cutting insert. When the cutting insert is broken or worn, it may be removed or replaced with a new or sharpened cutting insert without having to replace the more expensive bar.

Many cutting bars of the prior art are provided with an anvil having a recess or groove in which the cutting insert may be received and against which the insert may be clamped. In some of these tools, the anvils are integrally formed with the bar. Since the anvil is subjected to great stress and wear, it may be broken or worn beyond further use. With tools in which the anvil is integral with the bar, this means that the entire tool, including the relatively expensive bar, must be replaced.

To eliminate replacement of cutting tool bars, two-piece bar and anvil tools have been developed in which a broken or worn anvil may be replaced without having to replace an entire bar. However, most two-piece tools do not provide the rigidity present in a one-piece bar and anvil tool. Poor rigidity characteristics result in chatter, inferior machining and more frequent breakage of cutting inserts and anvils. Furthermore, in order to provide as much rigidity as possible, the anvil of many two-piece bar and anvil tools may be so fastened to the bar as to make anvil replacement difficult and time-consuming.

SUMMARY OF THE INVENTION

In the present invention, a cutting tool of multiple piece construction is provided. In a preferred embodiment the cutting tool includes a bar member, an anvil member, and a clamp member. The anvil member is removably fastened to one end of the bar member and is provided with an elongated recess in which a cutting insert may be received. The clamp member may be removably fastened to the anvil member for rigidly clamping a cutting insert in the elongated recess of the anvil member.

A high degree of rigidity is obtained by providing a wedge-shaped recess at one end of the bar member for receiving the anvil member which is correspondingly wedge-shaped. Due to the shape and design of the anvil member, only one screw is required for attaching the anvil to the bar member. The wedge recessed bar member, wedge anvil member and clamp member provide rigidity characteristics superior to cutting tools of the prior art.

The multiple bar, anvil and clamp construction of the present invention allows replacement of worn or broken anvils without having to replace the entire bar member. The single screw connection of the anvil member to the bar makes it easily and quickly replaceable. Replacement and removal of worn cutting inserts is also easily and quickly accomplished. Provision is made for varying size inserts. In addition, the cutting tool of the present invention is easily and economically manufactured.

Several embodiments of the invention will be described hereafter. Many other variations will be apparent to those skilled in the art from reading the description which follows in conjunction with the accompanying drawings.

BRIEF DESCRIPTION OF THE DRAWINGS

FIG. 2 is a side view of the embodiment of FIG. 1;

FIG. 3 is a top view, partially in section, of the embodiment of FIGS. 1 and 2;

FIG. 4 is an end view, partially in section, of the embodiment of FIGS. 1, 2, and 3.

DESCRIPTION OF PREFERRED EMBODIMENTS

Figure 1:
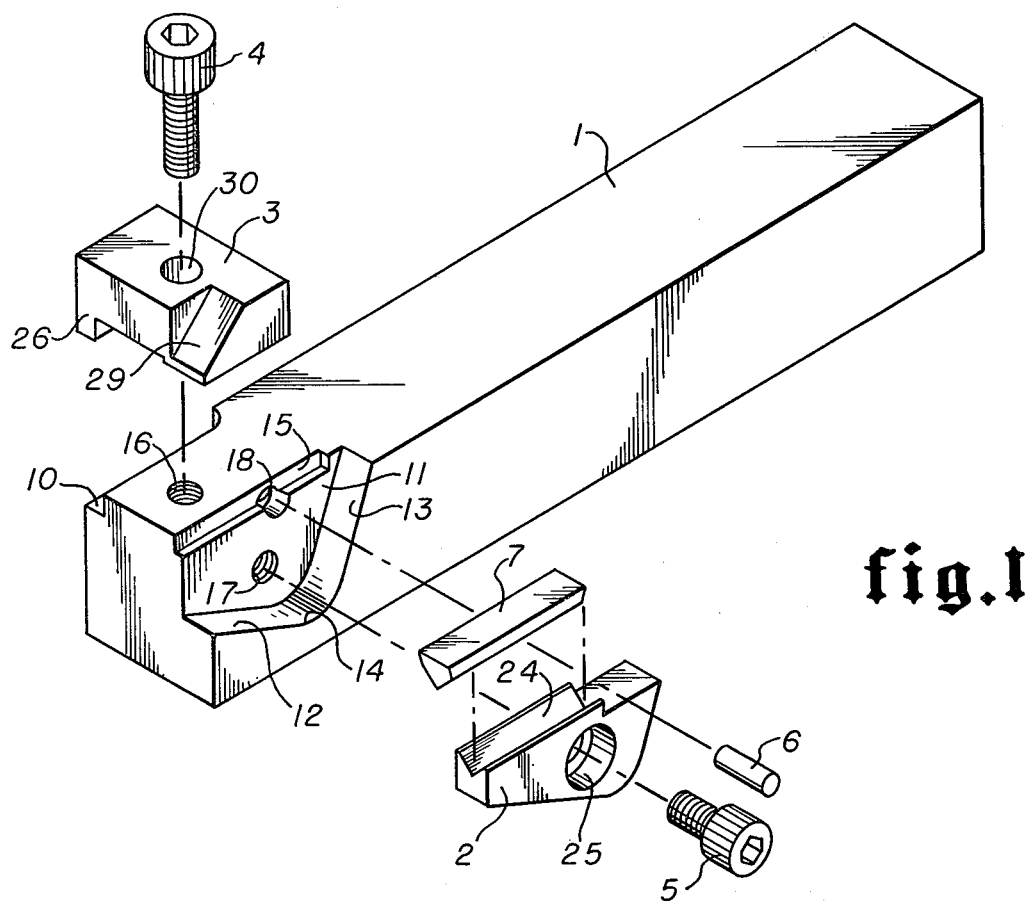
FIG. 1 is an exploded perspective view of a preferred embodiment of the invention.

Referring first to FIGS. 1 through 4, there is shown a cutting tool, according to a preferred embodiment of the invention, comprising three major components: an elongated bar member 1, an anvil member 2, and a clamp member 3. The tool also includes cap screws 4 and 5, stop pin 6 and may include a cutting insert 7.

The bar member 1 is preferably square or rectangular in cross section and is provided at one end thereof with a longitudinal recess 10 for receiving a portion of the clamp member 3 as will be more fully understood hereafter. The bar member is also provided at the same end on the opposite side of the recess 10 with a wedge-shaped recess, one side of which terminates in a flat surface 11, the other side of which opens away from the bar member. The bottom of the wedge-shaped recess is substantially formed by a pair of generally and mutually perpendicular surfaces 12 and 13. A generally curved surface 14 may provide a transition between the pair of surfaces 12 and 13. It will be noted that each of the pair of bottom surfaces 12 and 13 is upwardly inclined from the curved surface transition 14 relative to the longitudinal axis of the bar member 1.

It will also be noted that the bar member 1 is relieved adjacent the flat surface 11 of the wedge recess to provide another longitudinal recess 15. The purpose of the recess 15 will be more fully described hereafter.

The bar member is provided with threaded holes 16 and 17 for receiving cap screws 4 and 5, respectively. A smooth bore hole 18 is also provided for receiving stop pin 6.

The anvil member 2 is wedge-shaped to correspond with the wedge-shaped recess of bar member 1 and has flat sides 19 and 20, one of which, 19, normally lies against the flat surface 11 of the wedge-shaped bar recess. The bottom of the anvil member 2 is also formed by a pair of generally and mutually perpendicular surfaces 21 and 22 connected by a curved transition surface 23 to relate with the corresponding surfaces 12, 13 and 14 of the bar member recess.

The anvil member 2 is also provided with an elongated recess 24 in which a cutting insert 7 may be received. Although the cross section of the recess 24 could be of any design, a V-bottom cross section is preferred. At the inward end of the recess 24, the anvil member 2 is relieved so as to provide, when assembled, access to the stop pin hole 18 by the stop pin 6. A countersunk hole 25 is provided in the anvil member 2 for receiving cap screw 5.

The clamp member 3 is rectangulr-like in construction and may be provided at one end thereof with a depending rib or key 26 for disposition in the bar recess 10. A less prominent rib or projection 27 is provided at the opposite end for bearing against the cutting insert 7 and leaving a relieved area 28 between the two ribs 26 and 27. A portion of the clamp member directly above where the cutting insert is to be clamped may be chamferred at 29 to remove some of the weight and bulkiness thereof and to provide space for cutting chips. The clamp member 3 is also provided with a hole 30 for coaxial alignment with the threaded hole 16 of bar member 1 through which the cap screw 4 may be inserted for engagement with the threaded hole 16.

To assemble the tool, the anvil member 2 is simply placed in the wedge-shaped recess of the bar member so that its countersunk hole 25 is coaxially aligned with the threaded hole 17. The cap screw 5 is inserted for threaded engagement with the hole 17. When the cap screw is snugly engaged, the anvil member 2 is tightly and rigidly wedged in the wedge-shaped recess provided in the bar member 1. Either after or before the anvil member 2 is installed, the stop pin 6 is inserted in the stop pin hole 18.

Next, an insert 7 may be placed in the elongated recess 24 of the anvil member 2 and the clamp member 3 placed in position, rib 26 engaging recess 10 and rib 27 engaging the top of insert 7. The cutting insert 7 is installed abutting stop pin 6 so that its extension from the tool is predetermined. Cap screw 4 is then inserted through clamp member hole 30 for engagement with threaded hole 16. Tightening of the cap screw 4 securely and rigidly clamps the cutting insert 7 in place and the tool is ready for use. To replace the insert 7, the cap screw 4 need not be completely removed, but need only be loosened to the extent necessary to remove the cutting insert 7 and insert a new one.

It will be noted that the longitudinal recess 15 provides a relieved area adjacent the side of insert 7. The purpose of this relieved area is to allow the use of varying size inserts. Inserts are not uniform in width and if such a relieved area is not provided, the tool may not be universally fit for all cutting inserts.

The tool just described with reference to FIGS. 1–4 is preferably for external threading and shallow grooving, and is what is sometimes referred to as a righthand tool. For other applications, the tool can be made as a lefthand tool in which case the anvil member 2 would be mounted on the opposite side of the bar member 1. All other design and construction features would be essentially the same.

Figure 5:
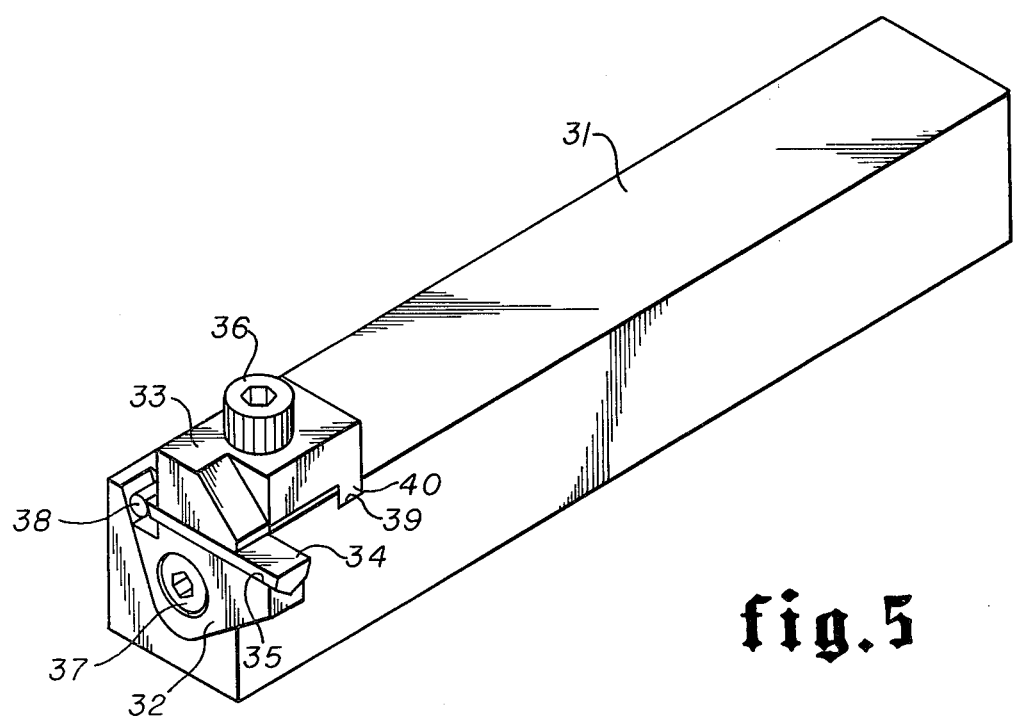
FIG. 5 is a perspective view of a cutting tool according to an alternate embodiment of the invention.

Now referring to FIG. 5, an alternate embodiment of the invention is shown which can also be used for external threading and shallow grooving. In addition, and especially, it can be used for internal threading and shallow grooving. In this embodiment, the anvil 32 and clamp member 33 are so mounted on the end of the bar member 31 that the axis of the cutting insert 34 to be held thereby will be substantially perpendicular to the longitudinal axis of the bar member 31.

Like in the previously described embodiment, the end of the bar member 31 is provided with a wedge-shaped recess for receiving the correspondingly wedge shaped anvil member 32. The flat side surface of the wedge-shaped recess is perpendicular to the longitudinal axis of the bar member so that when the anvil member 32 is installed therein, the longitudinal axis of the elongated recess 35, for receiving insert 34, is also perpendicular to the bar member longitudinal axis.

Like in the previous embodiment, this embodiment is also provided with cap screws 36, 37 and alignment pin 38. It will be noted that the recess 39 in the bar member 31 for the rib 40 of clamp member 33 is now lateral rather than longitudinal as in the previous embodiment. Assembly is essentially the same as with the previously described embodiment.

The embodiment of FIG. 5 is a righthand tool and as with the previously described embodiment can also be made as a lefthand tool. Regardless of whether the tool is righthand or lefthand or whether the insert extends laterally as in the embodiment of FIG. 5 or longitudinally as in the embodiment of FIGS. 1–4, the same wedged and rigid anvil mounting is provided. This design provides greater rigidity and superior machining to cutting tools of the prior art which have been designed for the similar uses. Furthermore, quick and easy anvil replacement is achieved through a one screw attachment which allows anvil replacement without bar replacement. The design permits minimal overhang for greater rigidity and the positive seating provided for the inserts resists lateral cutting forces.

Although several embodiments of the invention have been described herein, many other variations can be made without departing from the spirit of the invention. Therefore, it is intended that the scope of the invention be limited only by the claims which follow.

We claim:
1. A cutting tool comprising:
   an elongated bar member having a wedge-shaped recess at one end thereof, one side of which terminates in a flat surface, the other side of which opens away from said bar member and the bottom of which is formed by a pair of generally and substantially mutually perpendicular surfaces connected by a generally curved surface, said perpendicular surfaces being upwardly inclined, relative to the longitudinal axis of said bar member, as viewed from their intersections;
   a wedge shaped anvil member rigidly and removably fastened in said wedge-shaped recess and having an elongated recess in which a cutting insert may be received, at least one side of said wedge-shaped anvil member being flat and lying against said flat surface of said wedge-shaped recess, the bottom of said wedge-shaped anvil member resting against said pair of mutually perpendicular surfaces, said anvil member being fastened in said recess by a single screw disposed in a countersunk hole therein for engagement with a threaded hole in said flat surface of said recess and the tightening of which wedges said anvil member between said pair of mutually perpendicular surfaces forming the bottom of said wedge-shaped recess; and
   a clamp member removably fastened to said bar member for rigidly clamping said cutting insert in said elongated recess.
2. A cutting tool as defined in claim 1 in which said flat surface of said wedge-shaped recess is parallel to the longitudinal axis of said bar member so that the longitudinal axis of said elongated recess is also parallel to said bar member longitudinal axis.

3. A cutting tool as defined in claim 1 in which said flat surface of said wedge-shaped recess is perpendicular to the longitudinal axis of said bar member so that the longituinal axis of said elongated recess is also perpendicular to said bar member longitudinal axis.

4. A cutting tool as defined in claim 1 in which said bar member is relieved adjacent said flat surface of said wedge recess and said cutting insert, permitting said elongated recess to receive cutting inserts of widths greater than the width of said anvil member.

5. A cutting tool as defined in claim 1 in which said clamp member is rectangular-like in construction and provided at one end thereof with a depending rib for disposition in a corresponding recess in said bar member, rigidly aligning the opposite end of said clamp member for engagement with a cutting insert to be received in said elongated recess.

6. A cutting tool as defined in claim 5 in which said clamp member is provided at said opposite end with a second rib for bearing against said cutting insert, leaving a relieved area between said first and second ribs.

* * * * *